D. B. DIMICK.
METHOD OF FORMING PIPE JOINTS.
APPLICATION FILED FEB. 25, 1916.
1,213,760. Patented Jan. 23, 1917.
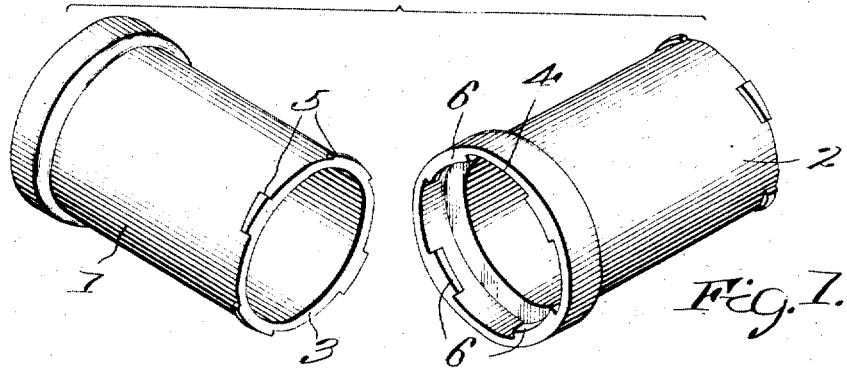
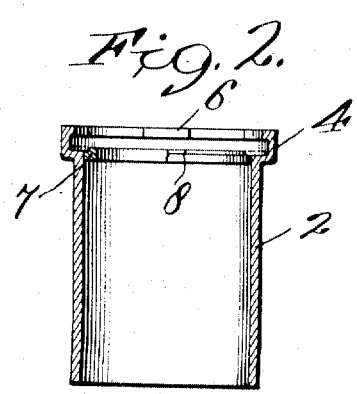
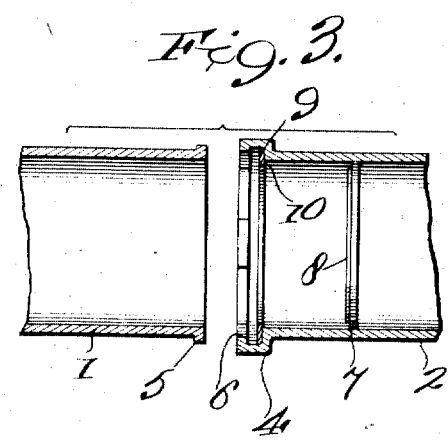
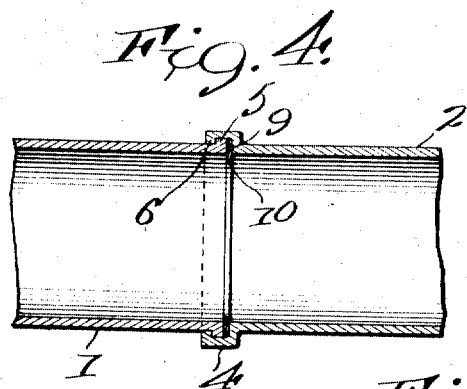
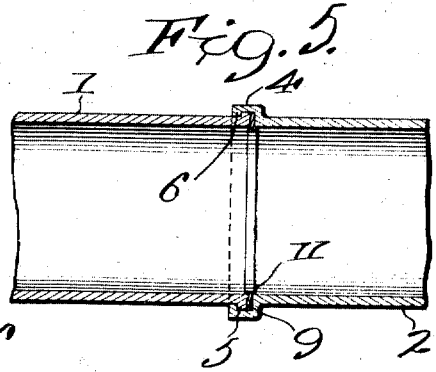
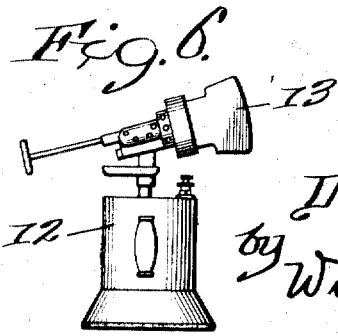

UNITED STATES PATENT OFFICE.

DANIEL B. DIMICK, OF BIRMINGHAM, ALABAMA, ASSIGNOR TO AMERICAN CASTING COMPANY, OF BIRMINGHAM, ALABAMA, A CORPORATION OF ALABAMA.

METHOD OF FORMING PIPE-JOINTS.

1,213,760.      Specification of Letters Patent.      Patented Jan. 23, 1917.

Application filed February 25, 1916. Serial No. 80,430.

*To all whom it may concern:*

Be it known that I, DANIEL B. DIMICK, a citizen of the United States, residing at Birmingham, in the county of Jefferson and State of Alabama, have invented certain new and useful Improvements in Methods of Forming Pipe-Joints; and I do hereby declare the following to be a full, clear, and exact description of the invention, such as will enable others skilled in the art to which it appertains to make and use the same.

The present invention relates to improvements in methods of forming pipe joints, and has for an object more particularly to provide an improved method for effecting fluid-tight joints between pipe sections.

With the foregoing and other objects in view the invention consists in the steps and processes more particularly herein after described and claimed.

The invention will be more fully understood by reference to the accompanying drawings, in which the same parts are indicated by similar reference numerals throughout the several views, and in which:—

Figure 1 is a perspective view of a pair of disassembled pipe sections; Fig. 2 is a central longitudinal sectional view of a single pipe section arranged to receive the plastic gasket; Fig. 3 is a longitudinal sectional view of the adjacent ends of a pair of pipe sections illustrating the gasket as molded in place; Fig. 4 is a view similar to Fig. 3, illustrating the sections assembled together on the gasket; Fig. 5 is an assembled view of the sections with the extending portion of the gasket ironed down; and Fig. 6 is an elevational view of the ironing tool.

Broadly stated, the improved process consists in attaching to the meeting end of one pipe section a permanently-plastic gasket possessing the property of strongly adhering to the iron, or other material, of which the pipe is constructed; and with a projecting portion extending into the pipe passage, which projecting portion is subsequently ironed down over the interior of the pipe ends to provide a fluid-tight joint therebetween.

Referring more particularly to the drawings, 1 and 2 designate adjacent sections of pipe having, respectively, spigot and bell-shaped meeting ends 3 and 4, provided each with circumferentially-spaced, wedge-shaped lugs 5 and 6, for coöperating to form an interlocking coupling when the sections are assembled in the manner illustrated in Figs. 4 and 5.

It will be understood that in assembling the sections 1 and 2, the lugs 5 are arranged to be received within the spaces between the lugs 6 on the adjacent bell 4, whereupon the sections are relatively rotated to inter-engage said lugs, and by virtue of the tapering rear faces, or wedge formation of the same, they will coöperate to forcibly move the pipe sections axially, and bring the meeting ends thereof into tight engagement, thus effecting a good joint between the same.

In accordance with the present invention, one section 2 of the pipe is disposed upright, as indicated in Fig. 2, with the bell 4 uppermost in readiness to receive a plastic gasket which is cast on the shoulder of the bell and between the outer wall thereof and a ring 7, of any suitable material, preferably aluminum, to which the gasket will not adhere. The ring 7 is provided with a flange 8 of lesser diameter, and projecting upwardly therefrom with respect to the position illustrated in Fig. 2, to provide with the adjacent portions of the bell 4 a circular cavity of rectangular cross-section for receiving molten material, which is poured therein through the upper end of the pipe and permitted to "freeze on" the end of the pipe to provide a permanently-plastic gasket, shown in place at 9 in Fig. 3. This gasket 9 is cast with a projecting portion 10, which appears to advantage in Fig. 4 as extending within the pipe passage. After the material of which the gasket 9 is formed has sufficiently hardened, the pipe section 2 is turned to the position as shown in Fig. 3, and the ring 7 withdrawn rearwardly through the pipe, as indicated in this figure. The pipe sections are now in readiness to be assembled, which assembled position is shown in Fig. 4.

The sections are assembled in the manner above indicated by rotation, and when so assembled the same will compress therebetween, the plastic gasket 9 causing the same to flow into the crevices in the meeting ends of the pipe, and adapt itself to any inequalities therein, thereby forming a tight joint. After assembly, the projecting portion 10 of the gasket 9 is pressed down, as indicated at 11 in Fig. 5, to bridge and cover the interior of the pipe sections, and this operation is preferably done by hot-ironing in order to provide a fluid-tight joint. The gasket will therefore be of a material which will readily melt under the influence of a relatively low degree of heat, and this ironing process is preferably accomplished by an operative with the implement shown in Fig. 6, which may be advantageously a common form of blow-torch 12, having attached thereto a shoe or iron 13, which is brought into contact with the portion 10 of the gasket and, readily fusing the same, will spread the material over the joint and cause said material to adhere to the opposite pipe sections; thus effectually closing the same against the entrance or exit of fluid.

This method is primarily intended for pipes of a large size, such as sewer or water pipes and the like, where a man can get into the interior of the pipe; where a smaller pipe is used an extension bar is used, carrying a heated cast iron shoe.

It will be understood that I do not desire to be limited to the use of this method on any particular formation of pipe sections, or interlocking pipe couplings; nor do I desire to restrict myself to any particular composition of matter for the gasket 9, 10; nor to any particular form of implement for carrying out said process; and it will be obvious that various changes and modifications may be made in the herein described steps and processes without departing from the spirit of my invention, and I reserve to myself the right to all such modifications of the method as come within the scope of the appended claims.

I claim:—

1. The method as described for forming a joint between pipe sections consisting in placing a gasket between said pipe sections having a projecting portion extending into the pipe passage, and pressing said projecting portion down to cover the joint, substantially as described.

2. The method as described for forming a joint between pipe sections, which consists in placing a plastic gasket between said pipe sections having a projecting portion extending into the pipe passage, and pressing said projecting portion down with the application of heat to cover the joint, substantially as described.

3. The method as herein described for forming a joint between pipe sections, which consists in casting a plastic gasket on one section with a portion extending into the pipe passage, bringing the pipe sections together on said plastic gasket, and smoothing down with the application of heat such extending portion of the gasket to bridge the interior walls of the section ends, substantially as described.

4. The method as herein described for forming a joint between pipe sections, which consists in casting on one pipe section a permanently-plastic gasket, with a portion extending into the pipe passage, bringing the pipe sections together forcibly on said gasket, and hot-ironing said extending gasket portion over the interior of the section ends to provide a fluid-tight joint, substantially as described.

5. The herein described method of forming a fluid-tight joint between interlocking pipe sections, which consists in casting on one section a permanently-plastic gasket having a portion extending into the pipe passage, bringing said pipe sections forcibly together over said gasket by a rotating movement to interlock the same and compress the gasket therebetween, and subsequently ironing down with the application of heat such extending gasket portion to cover the interior of the joint, substantially as described.

6. The herein described method of forming a joint between metallic pipe sections, which consists in casting on one section a permanently-plastic gasket possessing strong metallic-adhering qualities and having a portion thereof extending into the pipe passage, bringing said sections together on said gasket, interlocking said sections for compressing the gasket to flow into the crevices of the adjacent section and adhere thereto, and ironing said extending gasket portion down over the interior of the joint to render the same fluid-tight, substantially as described.

In testimony whereof I affix my signature.

DANIEL B. DIMICK.